(12) United States Patent
Gehb et al.

(10) Patent No.: US 10,746,369 B2
(45) Date of Patent: Aug. 18, 2020

(54) HEADLAMP FOR A MOTOR VEHICLE

(71) Applicant: Bayerische Motoren Werke Aktiengesellschaft, Munich (DE)

(72) Inventors: Tina Gehb, Unterhaching (DE); Thomas Hausmann, Munich (DE); Marcel Sieler, Menlo Park, CA (US)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 16/128,707

(22) Filed: Sep. 12, 2018

(65) Prior Publication Data
US 2019/0011102 A1    Jan. 10, 2019

Related U.S. Application Data

(63) Continuation of application No. PCT/EP2017/053904, filed on Feb. 21, 2017.

(30) Foreign Application Priority Data

Mar. 16, 2016  (DE) .................. 10 2016 204 344

(51) Int. Cl.
*F21S 41/255*    (2018.01)
*F21S 41/143*    (2018.01)
(Continued)

(52) U.S. Cl.
CPC .............. *F21S 41/255* (2018.01); *B60Q 1/06* (2013.01); *F21S 41/143* (2018.01);
(Continued)

(58) Field of Classification Search
CPC ........ F21S 41/265; F21S 41/255; F21S 41/43; F21S 41/40; F21S 41/435; F21S 41/47;
(Continued)

(56) References Cited

U.S. PATENT DOCUMENTS 4,868,718 A * 9/1989 Davenport ........... G02B 6/0008
362/511
4,949,227 A * 8/1990 Finch .................. B60Q 1/0011
362/232
(Continued)

FOREIGN PATENT DOCUMENTS

DE    20 2008 014 870 U1    2/2009
DE    10 2009 024 894 A1    12/2010
(Continued)

OTHER PUBLICATIONS

International Search Report (PCT/ISA/210) issued in PCT Application No. PCT/EP2017/053904 dated May 8, 2017 with English translation (six (6) pages).
(Continued)

*Primary Examiner* — Erin Kryukova
(74) *Attorney, Agent, or Firm* — Crowell & Moring LLP

(57) ABSTRACT

A headlamp for a motor vehicle has a multi-aperture projection display, which has a lighting device and a planar image generator and an array of projection lenses, wherein each projection lens is associated with a segment of the planar image generator such that, when the array is illuminated by the lighting device, at least some of the segments are projected in front of the headlamp by the associated projection lenses in order to produce at least one light distribution. Predetermined segments from the segments of the planar image generator in one or more partial areas of the planar image generator are designed and arranged in relation to each other in such a way that, when the illuminant is switched off, a symbol arrangement perceptible to an observer is presented on the planar image generator at a viewing angle of the observer in a predetermined viewing angle range toward the headlamp.

11 Claims, 4 Drawing Sheets

(51) Int. Cl.
*F21S 41/43* (2018.01)
*F21S 41/64* (2018.01)
*F21S 41/155* (2018.01)
*B60Q 1/06* (2006.01)
*F21Y 115/10* (2016.01)
*F21W 102/13* (2018.01)
*F21W 121/00* (2006.01)

(52) U.S. Cl.
CPC .............. *F21S 41/155* (2018.01); *F21S 41/43* (2018.01); *F21S 41/645* (2018.01); *F21W 2102/13* (2018.01); *F21W 2121/00* (2013.01); *F21Y 2115/10* (2016.08)

(58) Field of Classification Search
CPC ...... F21S 41/645; F21S 41/155; F21S 41/143; B60Q 1/06
See application file for complete search history.

(56) References Cited

U.S. PATENT DOCUMENTS

| | | | | |
|---|---|---|---|---|
| 5,931,576 | A * | 8/1999 | Kreysar | F21V 9/00 362/552 |
| 9,500,333 | B1 * | 11/2016 | Johnson | B60R 13/005 |
| 9,909,747 | B2 * | 3/2018 | Salter | F21V 23/003 |
| 2004/0149998 | A1 * | 8/2004 | Henson | B60Q 1/0011 257/98 |
| 2005/0207164 | A1 | 9/2005 | Holtz et al. | |
| 2008/0198372 | A1 * | 8/2008 | Pan | B60Q 1/38 356/121 |
| 2014/0146290 | A1 | 5/2014 | Sieler et al. | |
| 2014/0204602 | A1 * | 7/2014 | Jungwirth | F21S 41/143 362/521 |
| 2015/0270682 | A1 * | 9/2015 | Daniels | F21S 41/32 353/99 |
| 2016/0010811 | A1 * | 1/2016 | Benitez | F21S 41/143 362/509 |
| 2016/0265733 | A1 * | 9/2016 | Bauer | G02B 3/0006 |
| 2017/0305327 | A1 * | 10/2017 | Hoffmann | F21S 41/63 |
| 2018/0320852 | A1 * | 11/2018 | Mandl | F21S 41/322 |
| 2019/0072252 | A1 * | 3/2019 | Moser | F21V 11/186 |

FOREIGN PATENT DOCUMENTS

| | | |
|---|---|---|
| DE | 10 2011 076 083 A1 | 11/2012 |
| DE | 10 2014 213 636 A1 | 1/2015 |
| DE | 10 2013 222 792 A1 | 5/2015 |
| DE | 10 2013 020 753 A1 | 6/2015 |
| EP | 2 682 306 A2 | 1/2014 |
| WO | WO 2005/086125 A1 | 9/2005 |
| WO | WO 2014/164792 A1 | 10/2014 |
| WO | WO 2015/058227 A1 | 4/2015 |

OTHER PUBLICATIONS

German-language Written Opinion (PCT/ISA/237) issued in PCT Application No. PCT/EP2017/053904 dated May 8, 2017 (six (6) pages).

German-language Search Report issued in counterpart German Application No. 102016204344.7 dated Oct. 10, 2016 with partial English translation (ten (10) pages).

* cited by examiner

HEADLAMP FOR A MOTOR VEHICLE

CROSS REFERENCE TO RELATED APPLICATIONS

This application is a continuation of PCT International Application No. PCT/EP2017/053904, filed Feb. 21, 2017, which claims priority under 35 U.S.C. § 119 from German Patent Application No. 10 2016 204 344.7, filed Mar. 16, 2016, the entire disclosures of which are herein expressly incorporated by reference.

BACKGROUND AND SUMMARY OF THE INVENTION

The invention relates to a headlamp for a motor vehicle, in particular a front headlamp.

The prior art has disclosed many different principles for being able to generate predetermined light distributions using a motor vehicle headlamp. In the document WO 2015/058227 A1, a micro-projection light module is used in a motor vehicle headlamp, a light distribution in front of the motor vehicle being generated in the case of said micro-projection light module by way of a multiplicity of micro-optics. Here, a stop apparatus, by means of which it is possible to produce, for example, a low beam distribution, is provided between entrance optics and exit optics, which each comprise a multiplicity of micro-lenses.

Conventional motor vehicle headlamps on the basis of micro-production technology facilitate a highly precise generation of light distributions. However, no further light effects have been able to be generated to date using such headlamps.

It is an object of the invention to develop a motor vehicle headlamp on the basis of micro-projection technology with an additional light effect.

This and other objects are achieved by a headlamp according to the invention for a motor vehicle, such as an automobile, for example. The headlamp is preferably a front headlamp. The headlamp comprises a multi-aperture projection display with an illuminant and an planar image generator, and an array of projection lenses, wherein each projection lens is assigned to a segment of the planar image generator such that, when the array is illuminated by the illuminant, at least some of the segments are projected in front of the headlamp by the assigned projection lenses in order to produce at least one light distribution.

The headlamp according to the invention is distinguished by predetermined segments of the segments of the planar image generator being configured and arranged in relation to one another in one or more portions of the planar image generator in such a way that, when the illuminant is switched off, imagery that is perceivable by an observer is presented on the planar image generator in the case of a viewing angle of the observer in a predetermined viewing angle range toward the headlamp (i.e toward the light exit opening of the headlamp). The predetermined viewing angle range preferably comprises the viewing direction perpendicular onto the planar image generator. Depending on the configuration, the viewing angle range can be of different sizes. Optionally, the imagery can also be visible to the observer over substantially the entire angle range of 180° in front of the headlamp. In a preferred variant, the multi-aperture projection display also comprises an array of field lenses, which is arranged between the illuminant and the planar image generator, in addition to the array made of projection lenses. One or more LEDs or else, optionally, one or more laser diodes, are preferably used as illuminants in the projection display.

The headlamp according to the invention is advantageous in that the effect of visible imagery is produced in a simple manner by way of appropriately configured segments in the case of a deactivated headlamp. Here, the term "imagery" should be interpreted broadly. In particular, the imagery may contain text and/or one or more pictograms (e.g. logos) and the like. By way of example, the imagery can represent a logo and/or the lettering of a motor vehicle manufacturer.

In a particularly preferred embodiment, a multi-aperture projection display, as described in the document DE 10 2009 024 894 A1 or in the document DE 10 2011 076 083 A1, is used in the headlamp according to the invention. The entire disclosures of these documents are expressly incorporated by reference herein.

In a particularly preferred embodiment of the headlamp according to the invention, the predetermined segments are configured and arranged in relation to one another in such a way that, even when the illuminant is activated, the imagery is presented on the planar image generator at a viewing angle of the observer in a predetermined viewing angle range toward the headlamp. Here, the predetermined viewing angle range need not necessarily correspond to the aforementioned predetermined viewing angle range when the headlamp is deactivated. In particular, the predetermined viewing angle range can comprise the viewing direction perpendicular onto the planar image generator; however, the predetermined viewing angle range can also exclude a viewing angle range that contains the viewing direction perpendicular onto the planar image generator.

In a further preferred embodiment of the headlamp according to the invention, one or more of the predetermined segments each are light-opaque over their entire area or each have a transmittance of less than 100%, in particular of less than 50%, over their entire area. This variant ensures that the imagery is visible in the viewing direction perpendicular to the planar image generator, even when the illuminant is activated.

In a further variant of the headlamp according to the invention, one or more of the predetermined segments each have a light-transmitting aperture (i.e., with a transmittance of substantially 100%). Preferably, the respective predetermined segment is completely light-opaque apart from the light-transmitting aperture. In a preferred variant, the light-transmitting aperture is arranged centrally on the respective predetermined segment in a plan view. The use of light-transmitting apertures renders it possible to increase the brightness of certain regions (so-called hotspots) in the light distribution generated by the headlamp.

In a particularly preferred variant of the headlamp according to the invention, the extent of a respective segment in the vertical and horizontal direction (i.e. in the width direction and in the height direction of the motor vehicle when the headlamp is installed) does not exceed the diameter of the assigned (round) projection lens. The diameter of the respective projection lens preferably is 2000 µm or less, in particular 1000 µm or less, for example 800 µm. The multi-aperture projection display preferably comprises 1000 to 5000 segments with assigned projection lenses in the plan view onto the planar image generator.

In one configuration of the headlamp according to the invention, the image generator comprises a transparent substrate (i.e., with a transmittance of substantially 100%) with light-opaque regions applied thereon and/or with regions with a transmittance of less than 100%, in particular of less than 50%, applied thereon. By way of example, the regions applied thereon can be formed by a chrome mask. The transparent substrate is preferably a glass substrate. The headlamp according to this variant can be produced in a simple and cost-effective manner.

In a further embodiment of the method according to the invention, the planar image generator comprises a digital image generator, in particular an LCD display (such as a TFT display, for example). This digital image generator is actuatable in such a way that the structure of the segments can be varied such that different lighting effects can be produced. Preferably, the digital image generator is actuatable in such a way that different imagery is displayable on the digital image generator, depending on the actuation thereof.

In a further variant, the headlamp according to the invention is actuatable in such a way that, upon activation of the illuminant, the projection lenses of the array, and hence also the segments, are illuminated in succession until the entire array is illuminated. By way of example, the successive illumination can be performed in the horizontal direction or in the vertical direction of the planar image generator, or else optionally in an oblique direction. Using this variant, it is possible to generate an appealing lighting effect in the form of gradually lighting up imagery.

Different light distributions can be produced using the headlamp according to the invention, depending on the configuration. In particular, a low beam distribution, a high beam distribution and/or an antiglare high beam can be generated using the multi-aperture projection display. Other types of light distributions are also possible. In the case of a low beam distribution, the segments that are not predetermined segments are embodied as a stop in each case with a predetermined light/dark boundary.

In addition to the above-described headlamp, the invention further relates to a motor vehicle, wherein the motor vehicle comprises one or more of the headlamps according to the invention, or one or more preferred variants of this headlamp.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
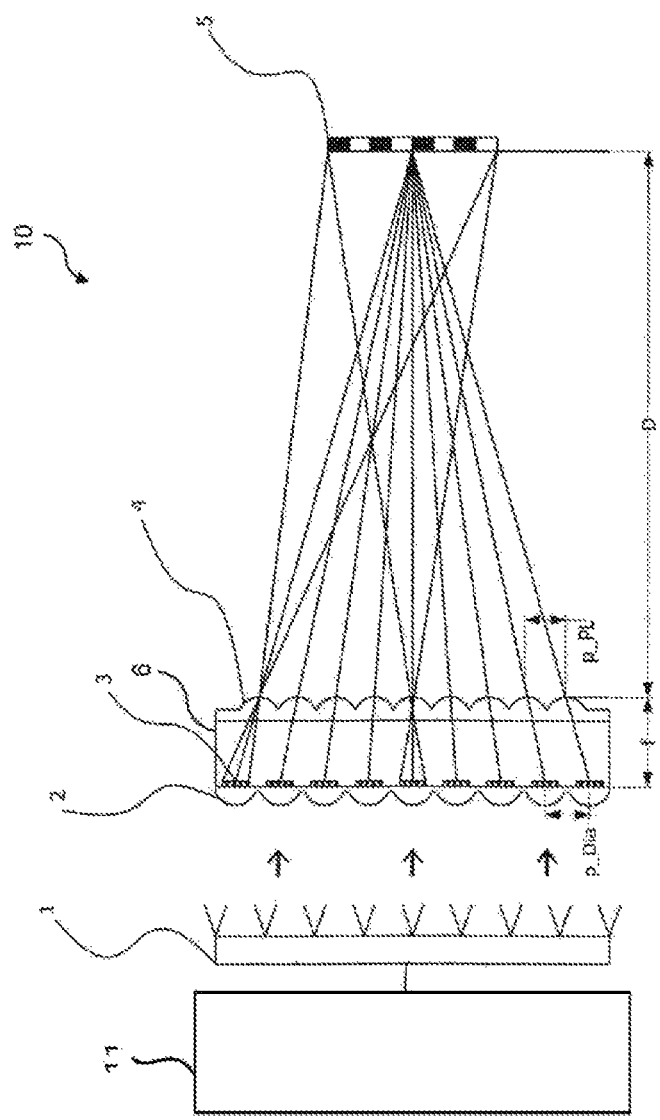
FIG. 1 is a sectional view of a known multi-aperture projection display.
Figure 4:
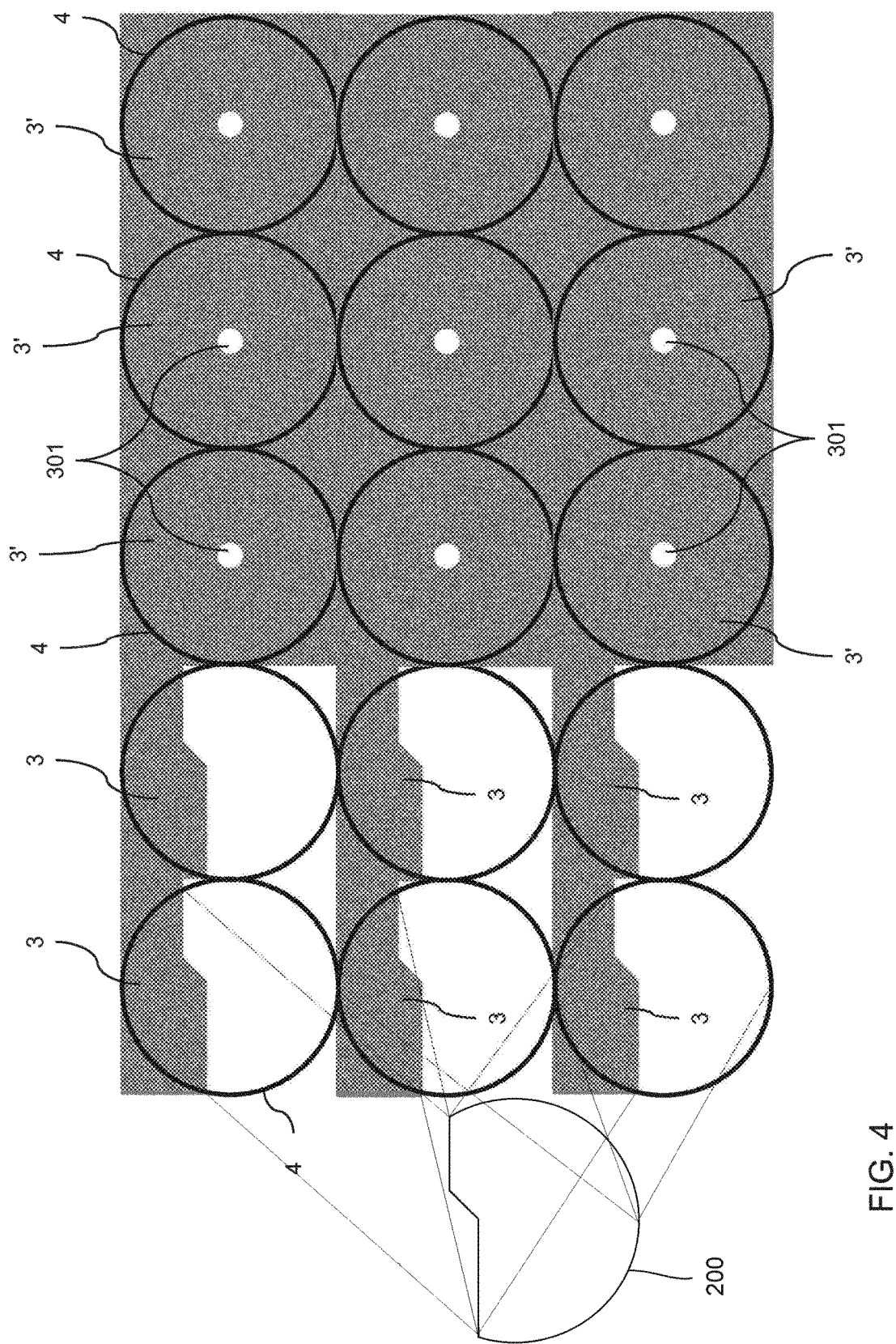
FIG. 4 is a detailed view of a section of the multi-aperture projection display of FIG. 3 at a boundary of the logo.

FIG. 1 shows a multi-aperture projection display, known per se, which is known from the document DE 10 2009 024 894 A1, arranged on a motor vehicle 11. This projection display is used in the headlamp according to the invention in a modified form. The projection display 10 comprises an illuminant 1, which can be embodied as a laser diode, LED or OLED, for example. The light of the illuminant strikes a field lens array in the form of a multiplicity of condenser lenses 2, which are applied to a substrate 6 (e.g. a glass substrate), wherein a segment 3 with an object structure of transmitting and light-opaque regions formed thereon is situated adjacent to each condenser lens 2. The light-opaque regions of the object structures are formed by a chrome mask that is applied to the substrate. The substrate with the chrome mask represents an embodiment of an planar image generator within the context of the invention. The projection display of the embodiment of the headlamp according to the invention, described further below, differs from the display of FIG. 1 in that some of the segments 3 are replaced by segments 3' (see FIG. 4). What the configuration and arrangement of the segments 3' achieves is that a logo becomes visible to the observer in a plan view of the display when the illuminant 1 is deactivated, as explained in greater detail below.

An array of projection lenses 4 is situated on the side of the glass substrate lying opposite the side with the object structures, wherein the distance between the projection lenses 4 and the object structures 3 substantially corresponds to the focal length f of the individual projection lenses. Each projection lens 4 is assigned to an object structure of a corresponding segment 3. The object structure is imaged via the corresponding projection lens into the projection plane 5 at a distance D from the array of the projection lenses. This is elucidated by the illustrated beam paths. It is possible to identify here that the pitch distance p_Dia between adjacent segments 3 is greater than the pitch distance p_PL between adjacent projection lenses 4. This brings about a tilt of the optical axes of the corresponding pairs of object structure and projection lens and, consequently, achieves a superposition of all projected images of the object structures of all segments 3 to form an overall image in the projection plane 5. Optionally, additional optical elements for further light field shaping may be situated upstream of the projection lenses 4, such as two Fresnel lenses (one for vertical scattering and one for horizontal scattered), for example.

The magnification M of the overall image in the projection plane 5 follows from the ratio of the projection distance D to the focal length f of the projection lenses 4 and is as follows:

$$M = \frac{D}{f} = \frac{p\_PL}{p\_Dta - p\_PL} \qquad (1)$$

Consequently, the magnification is dependent on the difference of the pitch distances between the object structures and the projection lenses. The smaller this difference, the greater the magnification and the further the projection plane lies away from the projection display.

Figure 2:
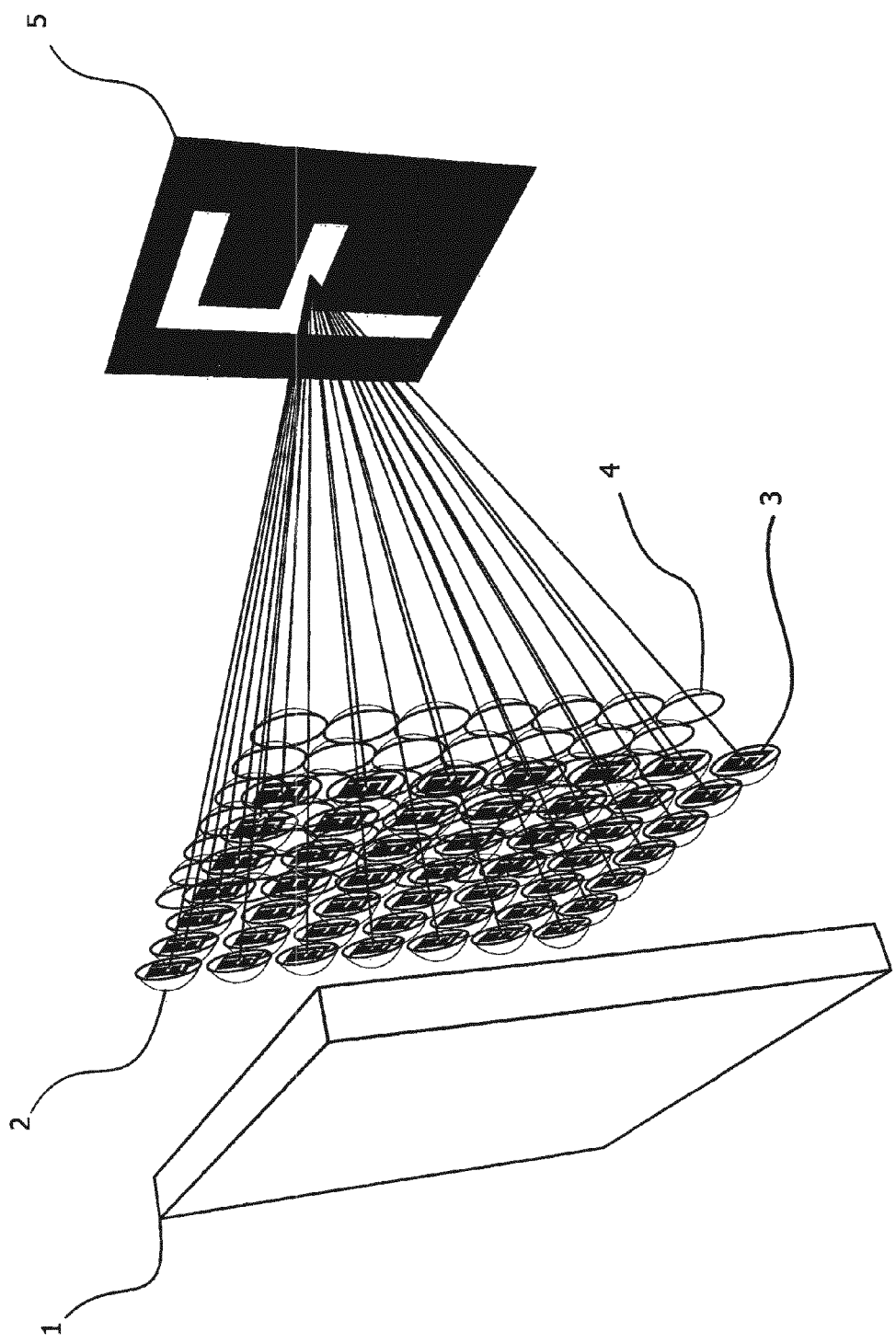
FIG. 2 is a perspective view for elucidating the projection of the multi-aperture projection display of FIG. 1.

FIG. 2 once again elucidates the image projection of the arrangement of FIG. 1. Here, object structures in the form of the transmissive letter "F" are reproduced in an exemplary manner. It is clear from FIG. 2 that each individual letter is imaged here via an appropriate projection lens 4 into the same enlarged letter in the projection plane 5. The letter in the projection plane 5 is consequently a superposition of the imaging from all object structures.

Figure 3:
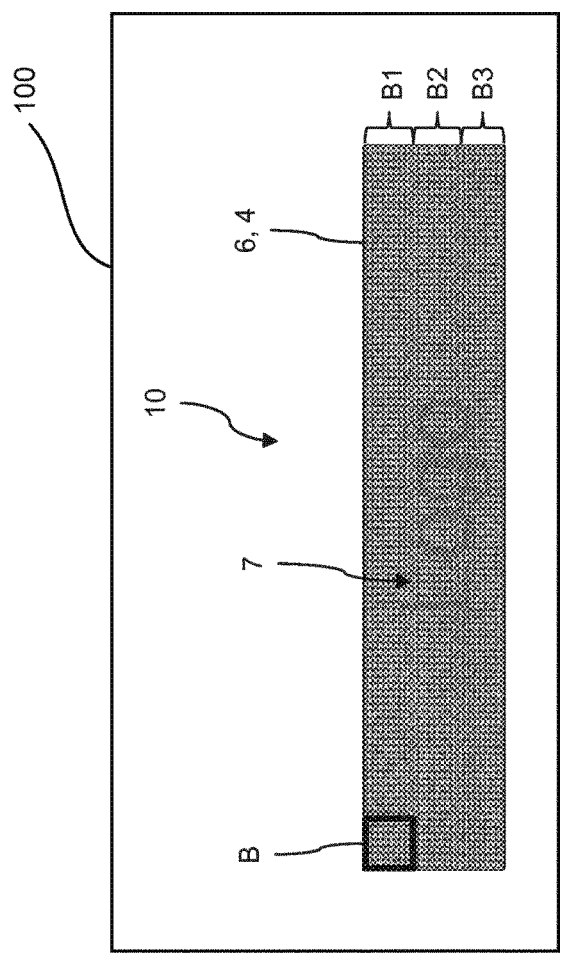
FIG. 3 is a plan view of an embodiment according to the invention of a multi-aperture projection display in the cold appearance in the case of a deactivated headlamp.

FIG. 3 shows a plan view of a multi-aperture projection display in an embodiment of the front headlamp according to the invention in a vehicle 100. In FIG. 3, it is possible to identify the dimensions of the glass substrate 6 with the projection lenses 4 arranged thereon. The planar image generator formed hereby has a rectangular form with a long side of approximately 10 cm and a height of approximately 3 cm. A multiplicity of LEDs are used as an illuminant, wherein each LED illuminates a square portion of the image generator. Such square region is presented in an exemplary manner in the upper left corner of the image generator and denoted by the reference sign B. Using the front headlamp of FIG. 3, it is possible by activating the corresponding LEDs to generate both a low beam distribution with a light/dark boundary and a high beam. Here, the central region B2 extending in the horizontal direction serves to generate the low beam, whereas the high beam is produced by adding the upper and the lower horizontal regions Bi and B3. The illustration of the display of FIG. 3 is purely exemplary and the invention can also be realized in headlamps whose multi-aperture projection display produces other light distributions and also possibly only a low beam distribution or a high beam distribution.

An essential feature of the display of FIG. 3 consists of the chrome mask largely covering respective segments of the image generator apart from an opening in portions of the substrate 6; i.e., segments 3', the areas of which are largely light-opaque, are used in these portions. Here, the arrangement of such segments is selected in such a way that the structure forms imagery 7, with this imagery being represented in an exemplary fashion by the term "Logo" in the exemplary embodiment of FIG. 3. This logo will be visible, inter alia, in the case of a perpendicular plan view of the observer on the image generator in the cold appearance (i.e. when the illuminant is deactivated). The logo 7 illustrated in FIG. 3 is merely exemplary and any other imagery can be reproduced as well. By way of example, the name or the logo of the manufacturer of the motor vehicle, in which the headlamp is installed, can be overlaid.

The logo 7 is visible in the cold appearance from almost all observation angles in front of the headlamp. Should the segments 3' be light-opaque over the whole area thereof, the logo is even visible in the case of an activated headlamp in the case of a perpendicular plan view of the observer on the image generator, and also from certain oblique observation angles as well. In a preferred variant, the individual LEDs are successively activated in a horizontal direction from left to right, or optionally in other directions as well, upon activation of the headlamp, and so the appealing effect of the slow illumination of the logo is generated.

In the embodiment of the headlamp of FIG. 3, the individual segments 3' of the logo 7 are not light-opaque over the entire area thereof; instead, they have a small central aperture. This becomes clear from the detailed view of FIG. 4. Here, it is possible to identify a transition region from a region of the image generator serving to generate the low beam distribution 200 to a region in which the logo is illustrated. In the region of the low beam distribution, stops for producing the light/dark boundary in the low beam distribution are formed by the segments or object structures 3 which may be, for example a chrome mask or elements of digital image generator in the form of an LCD display. Here, an object structure 3 with this light/dark boundary exists for each projection lens 4 (only some of which are denoted by reference signs). In the transition to a region of the logo, the segments 3' are now configured in a largely light-opaque manner, wherein, however, a central light-transmitting aperture 301 is provided in each of the segments. For reasons of clarity, the segments 3' and the apertures 301 are only partly denoted with reference signs in FIG. 4.

The size of the aperture 301 is preferably 0.1 mm or less, whereas the diameter of the individual projection lenses 4 is approximately 0.8 mm, for example. A hotspot in the central region of the light field can be produced in the light distribution generated by the headlamp by way of the illustrated apertures 301. The logo 7 remains identifiable when the illuminant is activated; however, it is still perceivable from oblique observation angles only and is no longer perceivable in the case of a perpendicular plan view onto the planar image generator.

The embodiments of the invention described above have a number of advantages. In particular, imagery that is visible to an observer can be generated in a simple manner by using a multi-aperture projection display in a motor vehicle headlamp. This imagery is identifiable over a large viewing angle range when the headlamp is deactivated. Further, the imagery is perceivable, at least from certain observation angles, even when the headlamp is activated. Moreover, appealing effects of lighting up of the imagery can be generated by successively activating the illuminant of the headlamp.

LIST OF REFERENCE SIGNS

1 Illuminant
2 Condenser lenses
3, 3' Segments
4 Projection lenses
5 Projection plane
6 Glass substrate
7 Imagery
10 Multi-aperture projection display
B, B1, B2, B3 Regions of the multi-aperture projection display The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:
1. A headlamp for a motor vehicle, comprising:
a multi-aperture projection display comprising an illuminant and a planar image generator, as well as an array of projection lenses, wherein
each projection lens is assigned to a segment of the planar image generator such that, when the array is illuminated by the illuminant, at least some of the segments are projected in front of the headlamp by the assigned projection lenses in order to produce at least one light distribution,
predetermined segments of the segments of the planar image generator are configured and arranged in relation to one another in one or more portions of the planar image generator such that, when the illuminant is switched off, imagery that is perceivable by an observer looking toward the headlamp is presented on the planar image generator,
the predetermined segments are configured and arranged in relation to one another such that, when the illuminant is activated, the imagery is presented on the planar image generator at a viewing angle of the observer that is oblique to a direction perpendicular to the planar image generator,
the planar image generator comprises a digital image generator which is actuatable such that a shape of an aperture in each of the segments is variable,
the digital image generator is an LCD display,
the digital image generator is actuable such that different imagery is displayable by the digital image generator, and the headlamp is actuable such that, upon activation of the illuminant, individual elements of the illuminant are illuminated in a successive manner such that respective ones of the projection lenses of the array are illuminated at different times until the entire array is illuminated.

2. The headlamp as claimed in claim 1, wherein one or more of the predetermined segments each are light-opaque over their entire area or each have a transmittance of less than 100%.

3. The headlamp as claimed in claim 1, wherein one or more of the predetermined segments each have a light-transmitting aperture.

4. The headlamp as claimed in claim 3, wherein the light-transmitting aperture is arranged centrally on the respective predetermined segment in a plan view.

5. The headlamp as claimed in claim 1, wherein the extent of a respective segment in the vertical and horizontal direction does not exceed the diameter of the assigned projection lens.

6. The headlamp as claimed in claim 1, wherein the diameter of each projection lens is 2000 μm or less, and/or the multi-aperture projection display comprises 1000 to 5000 segments with assigned projection lenses in the plan view onto the planar image generator.

7. The headlamp as claimed in claim 6, wherein the diameter of each projection lens is 1000 μm or less.

8. The headlamp s claimed in claim 1, wherein the image generator comprises a transparent substrate with light-opaque regions applied thereon and/or with regions with a transmittance of less than 100% applied thereon.

9. The headlamp as claimed in claim 1, wherein a low beam distribution, a high beam distribution and/or an antiglare high beam are producible via the multi-aperture projection display.

10. The headlamp as claimed in claim 1, wherein the headlamp is a front headlamp of the motor vehicle.

11. A motor vehicle, comprising one or more headlamps as claimed in claim 1.

* * * * *